Patented Aug. 25, 1953

2,650,229

UNITED STATES PATENT OFFICE 2,650,229

DERIVATIVES OF 2:3-DIHYDRO-4-METHYL-FURO(3:2-c) QUINOLINE AND PREPARATION THEREOF

Helmut Timmler, Hans Andersag, and Stephan Breitner, Wuppertal-Elberfeld, Germany, assignors to Schenley Industries, Inc., New York, N. Y., a corporation of Delaware No Drawing. Application May 28, 1951, Serial No. 228,765. In Germany May 27, 1950

3 Claims. (Cl. 260—288)

This invention relates generally to the synthesis of novel organic chemical compounds and, more particularly, it is concerned with the synthesis of polynuclear heterocyclic compounds useful in chemotherapy.

This application is related to our copending application Serial No. 228,761 as a companion application for isomerides of the same series of compounds. These compounds have interesting and useful properties making them suitable for use in chemotherapy particularly as analgesics, stimulants and amoebicides. This application is similarly related to our copending application Serial No. 228,762 also filed on May 28, 1951, disclosing the sulfur isologs of this series of compounds.

The novel compounds of this invention may be regarded as derived from 2:3-dihydro-4-methyl-furo(3:2-c) quinoline, which is represented by the formula:

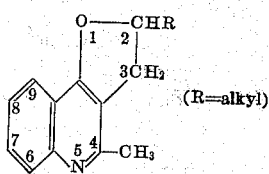

(R=alkyl)

having a bridging group, linked to one pair of adjacent positions of the bz nucleus, which comprises a secondary amino group in a chain with two carbon atoms linked by a double bond, which may be represented by the formula:

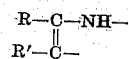

wherein R and R' are alkyl groups.

In accordance with the process of this invention, these novel compounds are obtained by condensing an aliphatic ketone with a bz-hydrazino - 2 - alkyl - 2:3 - dihydro-4-methyl-furo (3:2-c) quinoline to form the corresponding ketone hydrazone, then cyclizing this compound, by treatment with a reagent capable of effecting ring closure, such as glacial acetic acid, dilute or concentrated mineral acids or zinc chloride, whereby the desired final product is obtained. The hydrazino starting material may be produced easily by nitration and subsequent reduction of a 2 - alkyl - 2:3-dihydro-4-methyl-furo (3:2-c) quinoline yielding an amino compound that can be converted to the hydrazino compound, or, alternatively, it may be obtained by treating a bz-amino - 2 - alkyl-2:3-dihydro-4-methyl-furo (3:2-c) quinoline with nitrous acid to form a diazonium compound that subsequently may be reduced to the corresponding hydrazino compounds. These reactions may be summarized, in outline form, as follows

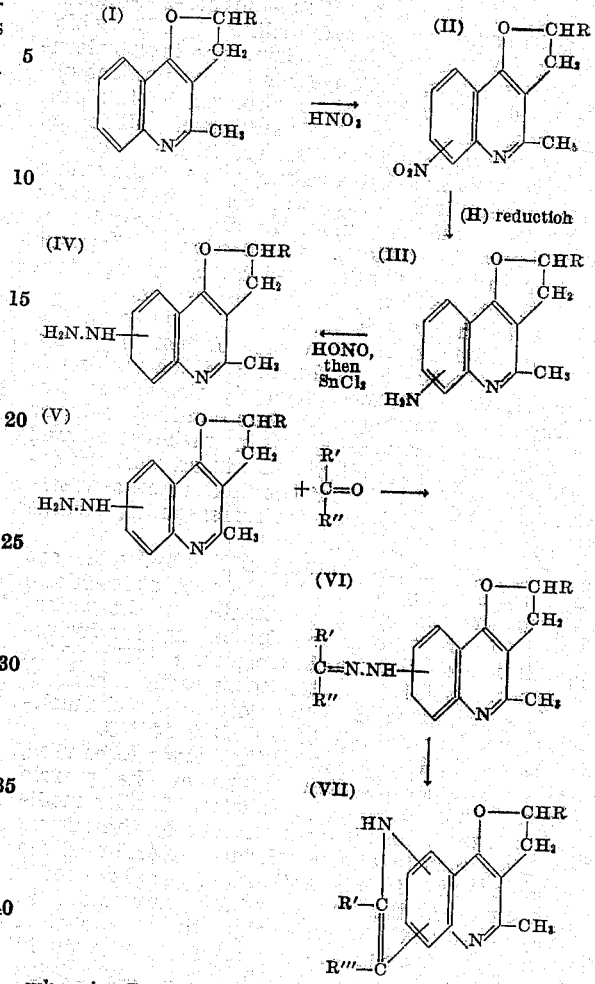

wherein R, R' and R" are alkyl groups, not necessarily the same, either R' or R" being comprised of at least 2 carbon atoms and R''' is an alkyl group that is the first lower homolog of that alkyl group, R' or R", that comprises at least 2 carbon atoms.

While the principles of this invention will be fully grasped from the foregoing by those versed in the methods of synthesis of organic compounds, an illustrative example herewith follows, provided by way of explanation merely, and without any intention that the invention will be limited thereby, for the operations described may be applied with like results to related starting materials.

Example

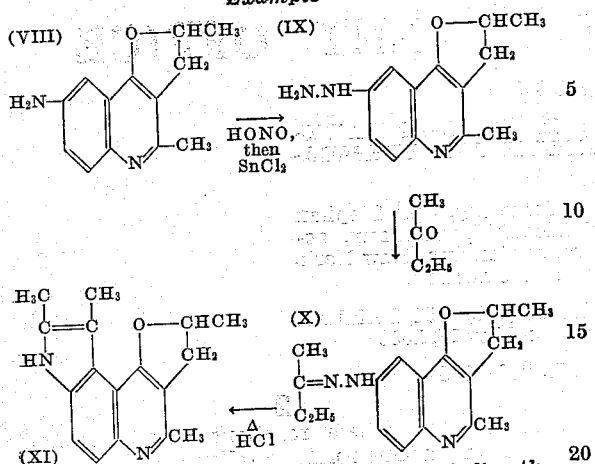

About 21.4 grams of 2:3-dihydro-2:4-dimethyl-8-aminofuro(3:2-c)quinoline (VIII) which may be prepared by cyclizing the intramolecularly rearranged allyl ether of the product obtained by cyclizing the hydrolyzed Schiff's base condensation product of p-aminoacetanilide and acetoacetic ester, are dissolved in about 170 cc. of concentrated hydrochloric acid and the amino compound is diazotized with 6.9 grams of sodium nitrite in the usual manner. This diazo-solution is added, in portions, to a solution of 45 grams of stannous chloride in 45 cc. of concentrated hydrochloric acid, at a temperature below 5° C., and the mixture is stirred for a brief period of time thereafter. Then the solution is poured into a caustic soda solution and the mixture is extracted with methylene chloride. The hydrazino compound (IX) thus obtained melts at 162° C. By condensing this hydrazino compound (IX) with methylethylketone in an alcoholic solution, with heating of the mixture on a waterbath for a half hour, the corresponding hydrazone (X) is obtained.

Approximately 25 grams of this hydrazone are introduced into half a liter of 20% hydrochloric acid and the mixture is heated on the waterbath for half an hour. On cooling, the hydrochloride of the indole derivative (XI) which forms, crystallizes. It is more easily soluble in water than it is in hydrochloric acid. The melting point of the free base (XI) is 244° C.

By suitable selection of the ketone to be used, the substituent alkyl groups of the pyrrolo moiety may be varied at choice. Similar modification of the alkyl substituent of the furano moiety may be effected through selection of the reagent used in the synthesis of the alkyleneoxy precursor of the starting amino compound, i. e., if the alkylene group is allyl, the furano alkyl substituent group will be methyl, and so on in the homologous series, as higher alkenyl groups are present, higher alkyl groups are found in the final product.

Having thus described the subject matter of this invention, what it is desired to secure by Letters Patent is:

1. As a novel composition of matter, a chemical compound represented by the formula:

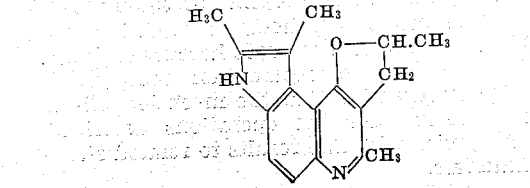

2. Process for the synthesis of organic chemical compounds that is represented as follows:

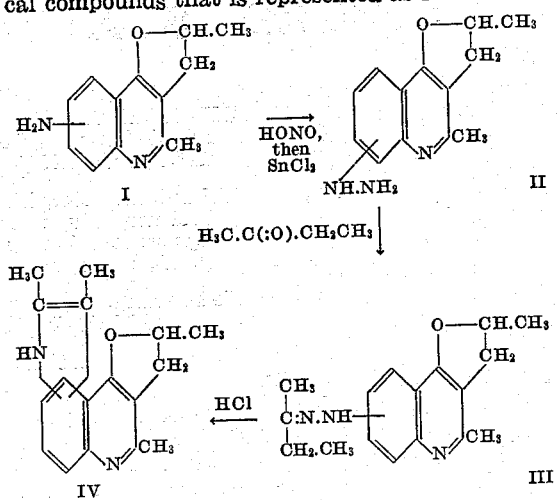

characterized in that the bz-amino-furo-quinoline starting material I is diazotized in an aqueous acidic solvent medium to produce the corresponding bz-diazo intermediate which is reduced in the cold with stannous chloride in an aqueous acidic solvent medium to yield the corresponding bz-hydrazino intermediate II which is condensed with methylethylketone by heating it therewith in an alcoholic solvent medium to obtain the corresponding bz-keto-hydrazone intermediate III which is cyclized to produce the desired final product by heating with hydrochloric acid.

3. Process for the synthesis of organic chemical compounds that is represented as follows:

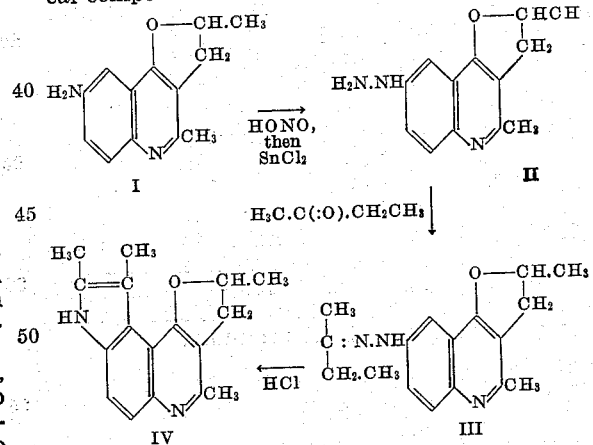

characterized in that the bz-amino-furo-quinoline starting material I is diazotized in an aqueous acidic solvent medium to produce the corresponding bz-diazo intermediate which is reduced in the cold with stannous chloride in an aqueous acidic solvent medium to yield the corresponding bz-hydrazino intermediate II which is condensed with methylethylketone by heating it therewith in an alcoholic solvent medium to obtain the corresponding bz-keto-hydrazone intermediate III which is cyclized to produce the desired final product by heating with hydrochloric acid.

HELMUT TIMMLER.
HANS ANDERSAG.
STEPHAN BREITNER.

References Cited in the file of this patent

Fieser et al.: "Organic Chemistry" (D. C. Heath and Co., Boston, 1944), page 32.